(12) United States Patent
Gallacher et al.

(10) Patent No.: US 9,460,241 B2
(45) Date of Patent: Oct. 4, 2016

(54) SYSTEM AND METHOD FOR NESTING A NONHYDROSTATIC MODEL IN A HYDROSTATIC MODEL

(71) Applicants: Patrick C. Gallacher, Pearl River, LA (US); Michael R. Schaferkotter, Gretna, LA (US); David A. Hebert, Diamondhead, MS (US)

(72) Inventors: Patrick C. Gallacher, Pearl River, LA (US); Michael R. Schaferkotter, Gretna, LA (US); David A. Hebert, Diamondhead, MS (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 611 days.

(21) Appl. No.: 13/753,750

(22) Filed: Jan. 30, 2013

(65) Prior Publication Data
US 2013/0197880 A1     Aug. 1, 2013

Related U.S. Application Data

(60) Provisional application No. 61/592,242, filed on Jan. 30, 2012.

(51) Int. Cl.
*G06F 7/60* (2006.01)
*G06F 17/10* (2006.01)
*G06F 17/50* (2006.01)

(52) U.S. Cl.
CPC ....... *G06F 17/5009* (2013.01); *G06F 2217/16* (2013.01)

(58) Field of Classification Search
CPC ................... G06F 17/5009; G06F 2217/16
USPC ............................................. 703/2
See application file for complete search history.

(56) References Cited

PUBLICATIONS

Liou, Chi-Sann, et al. "A method of upgrading a hydrostatic model to a nonhydrostatic model." Terrestrial, Atmospheric and Oceanic Sciences 20.5 (2009): 727.*
Duffy, Dean G. "Hydrostatic adjustment in nonhydrostatic, compressible mesoscale models." Monthly weather review 125.12 (1997): 3357-3367.*
Juang, Hann-Ming Henry. "The NCEP mesoscale spectral model: A revised version of the nonhydrostatic regional spectral model." Monthly weather review 128.7 (2000): 2329-2362.*
Wadzuk, Bridget M., and Ben R. Hodges. "Hydrostatic versus nonhydrostatic Euler-equation modeling of nonlinear internal waves." Journal of engineering mechanics 135.10 (2009): 1069-1080.*
Accadia, C., Mariani, S., Casaioli, M., Lavagnini, A., Speranza, A., Sensitivity of Precipitation Forecast Skill Scores to Bilinear Interpolation and a Simple Nearest-Neighbor Average Method on High-Resolution Verification Grids, Weather and Forecasting, vol. 18, pp. 918-932, Feb. 24, 2003.

(Continued)

*Primary Examiner* — Aniss Chad
(74) *Attorney, Agent, or Firm* — US Naval Research Laboratory; Scott G. Bell

(57) ABSTRACT

System and method for adjusting the values of the prognostic variables near the interface between a nonhydrostatic, high resolution model embedded in a hydrostatic, coarser resolution model. The system and method condition the outer domain lateral boundary values to enforce conservation of volume when the variables are interpolated onto the inner domain grid. The conditioning adjusts the baroclinic normal velocities at the open boundaries before interpolation. The system and method also include a relaxation scheme which matches the values of the prognostic variables across a zone near the open boundaries of the submesoscale inner domain to prevent the development of discontinuities, reflections and perimeter currents at the periphery of the inner domain.

9 Claims, 8 Drawing Sheets

(56) References Cited

PUBLICATIONS

Adcroft, A., Hill, C., Marshall, J., Representation of Topography by Shaved Cells in a Height Coordinate Ocean Model, Monthly Weather Review, pp. 2293-2315, Sep. 1997.
Beardsley, R.,C, Duda, T. F., Lynch, J. F., Irish, J. F., Ramp, S.R., Chiu, C.S., Tang, T. Y., Yang, Y.J., Fang, G., Barotropic Tide in the Northeast South China Sea, IEEE Journal of Oceanic Engineering, vol. 29, No. 4, pp. 1075-1086, Oct. 2004.
Barron, C.N., Kara, A.B., Martin, P.J., Rhodes, R.C., Smedstad, L.F., Formulation, implementation and examination of vertical coordinate choices in the Global Navy Coastal Ocean Model (NCOM), Ocean Modelling 11, pp. 347-375, 2006.
Blayo, E., Debreu, L., Revisiting open boundary conditions from the point of view of characteristic variables, Ocean Modelling vol. 9, pp. 231-252, 2005.
Chao, S.Y., Ko, D.S., Lien, R.C., Shaw, P.T., Assessing the West Ridge of Luzon Strait as an Internal Wave Mediator, Journal of Oceanography, vol. 63, pp. 897-911, May 29, 2007.
Coelho, E., Peggion, G., Rowley, C., Jacobs, G., Allard, R., Rodriguez, E., A note on NCOM temperature forecast error calibration using the ensemble transform, Journal of Marine Systems, vol. 78, pp. 5272-5281, Feb. 28, 2009.
Davies, H.C., Limitations of Some Common Lateral Boundary Schemes used in Regional NWP Models, Monthly Weather Review, vol. 111, pp. 1002-1012, Feb. 28, 1983.
Egbert, G.D., Bennett, A.F., Foreman, M.G.G., TOPEX/POSEIDON tides estimated using a global inverse model, Journal of Geophysical Research, vol. 99, No. C12, pp. 24821-24852, Dec. 15, 1994.
Gallacher, P.C., Hebert, D. A., Schaferkotter, M.R., Nesting a nonhydrostatic model in a hydrostatic model: The boundary interface, Ocean Modeling vol. 40, pp. 190-198, Sep. 2, 2011.
Guo, X., Hukuda, H., Miyazawa, Y., Yamagata, T., A Triply Nested Ocean Model for Simulating the Kuroshio-Roles of Horizontal Resolution on JEBAR, Journal of Physical Oceanography,vol. 33, pp. 146-169, Jun. 25, 2002.
Hodur, R.M., The Naval Research Laboratory's Coupled Ocean/Atmosphere Mesoscale Prediction System (COAMPS), Monthly Weather Review, vol. 125, pp. 1414-1430, Oct. 8, 1996.
Hogan, T.F., Rosmond, T.E., The Description of the Navy Operational Global Atmospheric Prediction System's Spectral Forecast Model, Monthly Weather Review, vol. 119, pp. 1786-1815, Feb. 14, 1991.
Jan, S., Chern, C.S., Wang, J., Chao, S. Y., Generation of diurnal K 1 internal tide in the Luzon Strait and its influence on surface tide in the South China Sea, Journal of Geophysical Research, vol. 112, C06019, Jun. 21, 2007.
Jensen, T.G. , Open boundary conditions in stratified ocean models, Journal of Marine Systems vol. 16, pp. 297-322, 1998.
Lavelle, J.W., Thacker, W.C., A pretty good sponge: Dealing with open boundaries in limited-area ocean models. Ocean Modelling, vol. 20, pp. 270-292, Oct. 22, 2007.
Lien, R.C., Tang, T.Y., Chang, M.H., D'Asaro, E.A., Energy of nonlinear internal waves in the South China Sea. Geophysical Research Letters, vol. 32, L05615, pp. 1-5, Mar. 12, 2005.
Marchesiello, P., McWilliams, J.C., Shchepetkin, A., Open boundary conditions for long-term integration of regional ocean models, Ocean Modelling vol. 3, pp. 1-20, 2001.
Marshall, J., Adcroft, A., Hill, C., Perelman, L., Heisey, C., A finite-volume, incompressible Navier Stokes model for studies of the ocean on parallel computers, Journal of Geophysical Research, vol. 102, No. C3, pp. 5753-5766, Mar. 15, 1997.
Marshall, J., Hill, C., Perelman, L., Adcroft, A., Hydrostatic, quasi-hydrostatic, and nonhydrostatic ocean modeling, Journal of Geophysical Research, vol. 102 No. C3, pp. 5733-5752, Mar. 15, 1997.
Martinsen, E.A., Engedahl, H., Implementation and Testing of a Lateral Boundary Scheme as an Open Boundary Condition in a Barotropic Ocean Model, Coastal Engineering, vol. 11, pp. 603-627, Jun. 4, 1987.
Mason, E., Molemaker, J., Shchepetkin, A.F., Colas, F., McWilliams, J.C., Sangra, P., Procedures for offline grid nesting in regional ocean models, Ocean Modelling vol. 35, pp. 1-15, Jun. 23, 2010.
Modave, A., Deleersnijder, E., Delhez, E.J.M., On the parameters of absorbing layers for shallow water models, Ocean Dynamics, vol. 60, pp. 65-79, 2010.
Orlanski, I., A Simple Boundary Condition for Unbounded Hyperbolic Flows, Journal of Computational Physics, vol. 21, pp. 251-269, 1976.
Palma, E., Matano, R., On the implementation of passive open boundary conditions for a general circulation model: The barotropic mode, Journal of Geophysical Research, vol. 103, No. C1, pp. 1319-1341, Jan. 15, 1998.
Riedlinger, S., Preller, R., Martin, P. Validation Test Report for the 1/16 East Asian Seas Navy Coastal Ocean Model Nowcast/Forecast System, NRL/MR/7320-06-8978, Ocean Dynamics and Prediction Branch, Oceanography Division, in 2 parts, pp. 1-68, Sep. 27, 2006.
Riedlinger, S., Preller, R., Martin, P. Validation Test Report for the 1/16 East Asian Seas Navy Coastal Ocean Model Nowcast/Forecast System, NRL/MR/7320-06-8978, Ocean Dynamics and Prediction Branch, Oceanography Division, in 2 parts, pp. 69-140, Sep. 27, 2006.
Shulman, I., Wu, C.R., Lewis, J.K., Paduan, J.D., Rosenfeld, L.K., Kindle, J.C., Ramp, S.R., Collins, C.A., High resolution modeling and data assimilation in the Monterey Bay area, Continental Shelf Research, vol. 22, pp. 1129-1151, 2002.
U.S. Appl. No. 61/592,242, System and Method for Nesting a Nonhydrostatic Model in a Hydrostatic Model, Patrick Charles Gallacher, filed Jan. 30, 2012.
Chiles, Jean-Paul and Delfiner, Pierre, Geostatistics Modeling Spatial Uncertainty, Chapter 2, in 2 parts, pp. 29-75, 1999.
Chiles, Jean-Paul and Delfiner, Pierre, Geostatistics Modeling Spatial Uncertainty, Chapter 2, in 2 parts, pp. 76-149, 1999.

\* cited by examiner

SYSTEM AND METHOD FOR NESTING A NONHYDROSTATIC MODEL IN A HYDROSTATIC MODEL

CROSS-REFERENCE TO RELATED APPLICATIONS

This application claims the benefit of priority based on U.S. Provisional Patent Application No. 61/592,242 filed on Jan. 30, 2012, the entirety of which is hereby incorporated by reference into the present application.

BACKGROUND

Methods and systems disclosed herein relate generally to adjusting values at the interface between numerical models, and in particular to adjusting prognostic variables between models of different resolutions and dynamics. Modeling submesoscale dynamics, scales of 10 m to 1 km, requires resolutions that preclude global modeling and dynamics that are unnecessary for global scales. In order to model submesoscale dynamics as part of a global forecasting system, as is the ultimate goal, a smaller model domain with open boundaries derived from a coarser, larger scale model is required. Method(s) may be needed to handle the open boundaries of the submesoscale domain. As the name open boundary implies, fluid must be able to flow freely in and out of the model domain. Also, scales of motion too large to be contained in the submesoscale domain must correctly influence the flow in the domain. The boundaries of the submesoscale domain should be truly transparent, i.e. they should be invisible in the results of the modeling.

For a one-way coupled case, open boundary conditions between a submeso scale, nonhydrostatic inner domain and a mesoscale, hydrostatic outer domain may be required to meet certain conditions. The submesoscale resolution allows dynamic features to be resolved which may not be captured at mesoscale resolution. Furthermore, in order to model submesoscale dynamics which includes nonlinear internal waves (NLIWs) with large amplitude (100 s of meters) and subinertial eddies and filaments, a nonhydrostatic model with resolution of 10's to 100's of meters in the horizontal and meters to 10's of meters in the vertical may be used. The difference in the physics between the nonhydrostatic model and the hydrostatic model can lead to differences in the solutions that exacerbate the problems of interfacing the nested models. When a mismatch of the solutions occurs at the interface between the domains, spurious reflections and erroneous perimeter currents along the boundaries can result. Also, incorrect geostrophic currents can be set up along the open boundaries by erroneous density gradients across the boundaries.

Open boundary conditions, (OBCs) can transparently provide information to the inner domain from the outer domain and propagate information out of the inner domain. In one-way coupling, the information propagated out of the inner domain does not affect the outer domain. Because of the differences in physics and resolution, there could be inherent differences between the mesoscale solution and the submesoscale solution. Prognostic variables from the coarse grid can be interpolated onto the fine grid in a manner that conserves basic properties and scales. This interpolation can be problematic since the most common interpolation schemes are not conservative, e.g. bilinear and nearest neighbor. Methods for formulating and applying OBCs to limited area models can be divided into two categories: 1) adaptive and 2) consistent.

Adaptive methods differentiate between incoming and outgoing fluxes and apply different OBC values based on the direction of the flux. Consistent OBCs apply the same values regardless of the direction of the boundary flux. The advantage of using adaptive OBCs is that different OBCs can be applied for each case. This allows the response to be tailored to the characteristics and scales of the outer domain or inner domain solution as appropriate. Disadvantages of adaptive OBCs include: determining which points qualify as inflow and which qualify as outflow, handling transitions between adjacent inflow and outflow areas, and handling strong tangential flows. Adaptive OBCs are further complicated by the fact that any open boundary point could simultaneously be an inflow point for some scales and an outflow point for others.

Consistent OBCs apply the same method to all open boundary points. These methods are typically a form of wave radiation, absorption or relaxation scheme. Problems with radiation schemes stem from the fact that multiple waves with different phase speeds can exist in realistic cases, whereas the radiation schemes can use only one phase speed. Absorption schemes typically have a region where the viscosity is artificially increased to damp the solution near the boundaries. Relaxation schemes can involve a region near the boundaries in which the inner and outer values are smoothly merged. One issue with relaxation and absorbing layers is that the equations governing the motion in the boundary layer are not the correct equations for any approximation of the physics so spurious solutions can result. For simulations involving idealized or climatological case studies of processes, the large scale flow can be prescribed as constant or a simple function of time and the OBCs merge these values with the flow field from the submesoscale domain. For predictions whether in real-time, i.e. forecasts, or offline, i.e. hindcasts, the problem is more complicated. In these cases, the OBCs must be able to merge the multiple time and space scales of the larger scale dynamics and the multiple time and space scales of the resolved submesoscale dynamics. What is needed is a method for use of consistent OBCs that overcomes the limitations of currently-used methods. What is further needed is an interpolation method for transporting momentum across a boundary, and overcomes the problems of 1) a secular trend that develops in the numerical solution to the dynamics in a nonhydrostatic domain nested inside a hydrostatic domain, and 2) energy in the form of waves and vorticies that becomes trapped in the inner domain because it is erroneously reflected at the lateral boundaries. What is further needed is a system that creates a set of momentum conserving boundary conditions for the incoming flow and a flow relaxation region to match the inner and outer solutions and prevent reflection into the inner domain

SUMMARY

The system and method of the present embodiment extend and improve two OBC methods which together correct the problems of conservation and matching at the interface between a hydrostatic outer domain and a nonhydrostatic inner domain. In the first method, termed herein as the transport correction scheme (TCS), OBCs are formulated to conserve volume by matching the change in sea surface height, $\eta$, and the total transport through the lateral boundaries and distributing the difference into the baroclinic transports. In the second method, termed herein as the flow relaxation scheme (FRS), OBCs are constructed to prevent reflections and perimeter currents which can be generated when flows do not exit the interior domain correctly. This is related to a mismatch of coarse and fine resolution values near the interface. The FRS allows outer domain values to propagate into the inner domain with minimal distortion.

The method of the present embodiment for correcting the baroclinic normal velocity on an inner domain can include, but is not limited to including, the steps of bilinearly interpolating transport values of an outer domain to an inner grid of an inner domain at points along lateral boundaries of the inner domain, the outer domain encompassing the inner domain, interpolating sea surface height η from an outer grid of the outer domain to the inner grid, correcting the interpolated transport values by setting an average of the interpolated transport values to zero for every time interval between each boundary value of the outer domain, setting a relaxation zone adjacent to the lateral boundaries, the relaxation zone having a predetermined width and an absorption coefficient of a predetermined value at the outer edge of the relaxation zone, the relaxation zone enabling outwardly directed fluxes to exit smoothly and without reflection and without generation of artificial perimeter currents, and the relaxation zone enabling fluxes from the outer domain to enter and affect a solution in the inner domain without creating a discontinuity and without being excessively damped, and computing the corrected baroclinic normal velocity based on the corrected interpolated transport values, the interpolated sea surface height, and the relaxation zone. The method can optionally include the steps of providing the corrected barometric normal velocity to a numerical model, receiving the inner domain, the outer domain, the transport values, the lateral boundaries, and the inner grid from an electronic communications network, and receiving the inner domain, the outer domain, the transport values, the lateral boundaries, and the inner grid from electronic input.

A system for correcting the baroclinic normal velocity on an inner domain can include, but is not limited to including, a transport value interpolator bilinearly interpolating transport values of an outer domain to an inner grid of an inner domain at points along lateral boundaries of the inner domain, the outer domain encompassing the inner domain, a sea surface height interpolator interpolating sea surface height η from an outer grid of the outer domain to the inner grid, an interpolation editor correcting the bilinearly interpolated transport values by setting an average of the bilinearly interpolated transport values to zero for each time interval between each boundary value of the outer domain, a relaxation zone creator setting a relaxation zone adjacent to the lateral boundaries, the relaxation zone having a predetermined width and an absorption coefficient of a predetermined value at the outer edge of the relaxation zone, the relaxation zone enabling outwardly directed fluxes to exit smoothly and without reflection and without generation of artificial perimeter currents, and the relaxation zone enabling fluxes from the outer domain to enter and affect a solution in the inner domain without creating a discontinuity and without being excessively damped, and a velocity processor computing a corrected baroclinic normal velocity based on corrected interpolated transport values, interpolated sea surface height, and the relaxation zone. The velocity processor can optionally provide the corrected barometric normal velocity to a numerical model. The transport value interpolator can optionally receive the inner domain, the outer domain, the transport values, the lateral boundaries, and the inner grid from an electronic communications network. The transport value interpolator can optionally receive the inner domain, the outer domain, the transport values, the lateral boundaries, and the inner grid from electronic input.

Open boundaries naturally occur when modeling submesoscale dynamics since the domains of interest are limited by the small grid spacing needed to resolve the dynamics. The boundaries provide information about the larger scale outer domain dynamics on the inner domain grid but should not introduce erroneous trends. Also, the mismatches of the solutions in the inner and outer domains can be adjusted at the boundaries to prevent contamination of the inner domain solution. These mismatches, caused by differences in resolution, physics and numerics, manifest at the boundaries of the inner domain as reflections of momentum and energy and as spurious perimeter currents. OBCs from the outer domain are mapped onto the inner domain grid and adjusted to conserve volume. In the present embodiment, TCS is used to adjust the baroclinic normal velocities such that the change in η is balanced by the total barotropic transport through the open boundaries. The baroclinic normal velocities are weighted by the lateral surface area of the grid cell adjacent to the open boundaries to conserve total transport.

Dynamic features generated or transformed in the inner domain can be quite different from those in the outer domain. In fact, some dynamic features in the inner domain will not be present in the outer domain. This can be due to increased resolution in the inner domain, in which case the features are not resolved in the outer domain. It can be due to differences in hydrostatic versus nonhydrostatic physics, in which case the feature would not exist in the outer domain even if the resolution in the two domains were the same. Finally, this can be due to differences in the numerics or the numerical parameters between the two domains, in which case the features might be damped out or dissipated in the outer domain. In any case, the differences will be manifested as discrepancies in the prognostic variables near the open boundaries. This can lead to reflections, perimeter currents and other spurious features of the solution on the inner domain. These spurious features should not be allowed to propagate into the inner domain and contaminate the results. A solution is to construct a relaxation zone along the perimeter of the inner domain where these spurious features can be removed from the inner domain solution using a FRS. It is desirable to have the relaxation zone as narrow as possible to maximize the area available for the inner domain solution. At the same time, the spurious features must be damped well enough that they do not significantly impact the solution in the inner domain or the boundary values from the outer domain. The spatial characteristics and maximum value of relaxation coefficient are both important to the effectiveness of FRS in the relaxation zone. In the present embodiment, a relatively small relaxation coefficient with a hyperbolic tangent spatial distribution that varies slowly near the inner domain side of the relaxation zone and varies rapidly near the outer domain side of the relaxation zone can be chosen. The solution on the inner domain can be more accurate and there may be no erroneous perimeter currents, combining flow relaxation and conservation methods in the same boundary condition and being particularly careful about enforcing conservation.

DETAILED DESCRIPTION

Figure 1:
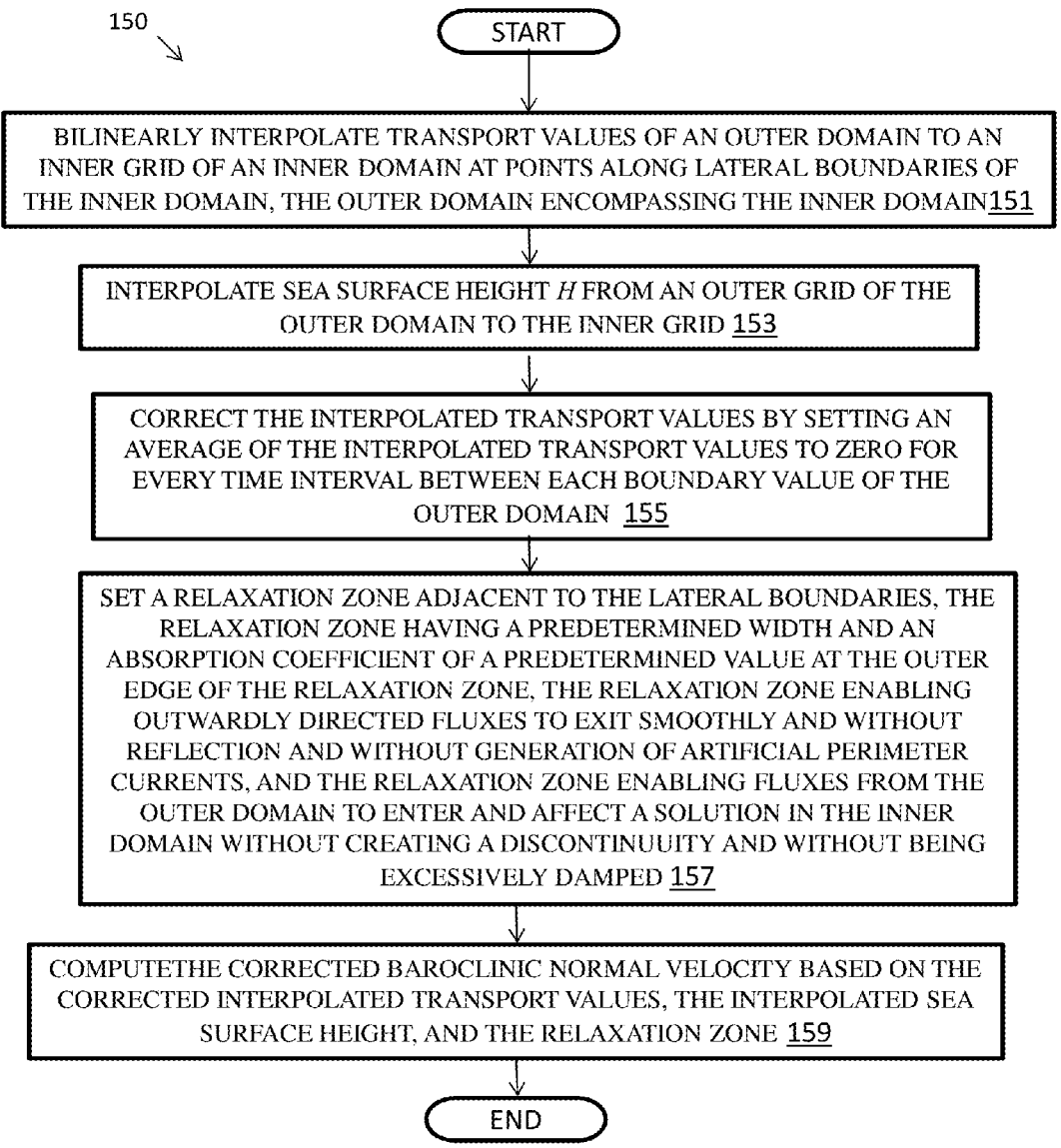
FIG. 1 is a flowchart of the method of the present embodiment.

The problems set forth above, as well as, further and other problems are solved by the present teachings. These solutions and other advantages are achieved by the various embodiments of the teachings described herein below.

The TCS embodiment is a computer system and method for interpolating and correcting the transport between the outer domain and the inner domain. In the TCS, the outer domain values are interpolated to the inner domain grid at points along the lateral boundaries using bilinear interpolation. η is also interpolated from the coarse grid to the fine grid. Additionally, since the outer domain is a part of an operational system the values may have been interpolated onto different grids for archiving or analysis purposes prior to the interpolation onto the inner domain grid. Each interpolation can generate errors resulting in a loss of volume conservation. For both the transport and η, and particularly the former, the interpolation is not conservative. Furthermore, the fact that the transport and η are interpolated separately can lead to an imbalance between the fields. Small errors in the normal velocities through the sides can cause significant changes in transport into the inner domain and this is reflected in large deviations in η over time.

Volume conservation requires that the net transport through the lateral boundaries is equal to the temporal change of η in the inner domain. However, the geometry of ocean domains, i.e. small aspect ratio (h/L) guarantees that the change η will be small. In the present embodiment, the transport can be corrected through the domain by setting the total transport to zero for every time interval between the outer domain boundary values (one hour in this case).

The total transport through the lateral boundaries can be specified as:

$$\varsigma_{\tau_1} = \frac{1}{\tau_2 - \tau_1} \int_{\tau_1}^{\tau_2} \int_\Gamma \int_0^h u_n(b,z) dz h(b) db dt \qquad (1)$$

where b are the points along the open boundary, $\Gamma$, $u_n$ is the normal baroclinic velocity at b, h is the depth at b and $\tau_1$ and $\tau_2$ are successive outer domain data time points. The change in η averaged over the inner domain is given by $$\overline{\eta}_t = \frac{\partial}{\partial t} \frac{\int\int_S \eta dS}{\int\int_S dS} \qquad (2)$$

where S is the surface area of the inner domain. If volume is conserved, then, $\varsigma_{\tau_1} = \overline{\eta}_t$. However, interpolation and other factors can prevent this equality from holding. Thus, $$\varsigma_{\tau_1} = \overline{\eta}_t + \epsilon_\zeta \approx \epsilon_\zeta \qquad (3)$$

where $\epsilon_\zeta$ is the error in the transport and it is much larger than $\overline{\eta}_t$. This imbalance can be corrected by adjusting $u_n$ uniformly at every grid point along the open boundaries at every inner domain timestep based $\epsilon_\zeta$. Thus, $$u_n^*(b,z) = u_n(b,z) - \frac{\varepsilon_\zeta}{\int_\Gamma h(b) db} \cdot \hat{n} \qquad (4)$$

is the corrected baroclinic normal velocity from the outer domain interpolated onto the open boundary of the inner domain where $\hat{n}$ the inward directed normal vector at the boundary is.

Differences in resolution, physics, and numerics can cause hydrodynamic features to be different in scale and dynamics between the outer and inner domains. To prevent errors that arise due to variations between these values from propagating into the inner domain, a relaxation zone can be included in the inner domain adjacent to the lateral boundaries. The relaxation zone is an area where the fluxes of conserved baroclinic quantities from the coarse and the fine grids can be matched.

Relaxing the solutions can be viewed as two separate problems—allowing outwardly directed fluxes to exit smoothly and without reflection or the generation of artificial perimeter currents, and allowing the fluxes from the outer domain to enter and affect the inner solution without creating a discontinuity or being excessively damped.

Allowing outwardly directed fluxes to exit smoothly and without reflection or the generation of artificial perimeter currents can be addressed by radiation or diffusion of conserved quantities. Diffusive techniques employ a form of sponge or absorbing layer where the viscosity and diffusivity are artificially increased, damping the inner domain conserved quantities to zero as the boundary is approached. The damping needs to be smooth and complete such that there is no reflection back into the domain and no generation of spurious modes in the relaxation zone.

In the present embodiment, the FRS technique for matching the solutions across the boundary can be used to allow the fluxes from the outer domain to enter and affect the inner solution without creating a discontinuity or being excessively damped. The basic formulation for the FRS is $$\frac{D\chi}{Dt} = RHS - \sigma(n)\chi \qquad (5)$$

where $\chi$ is any of the baroclinic prognostic variables, e.g. temperature, T, salinity, S, eastward velocity, u, or northward velocity, v. RHS represents all the terms on the right hand side of the Eulerian equation describing the total rate of change, D/Dt, of the prognostic variable $\chi$ and $\sigma(n)$ is the relaxation coefficient in the relaxation zone. The relaxation zone is part of the inner domain solution with the addition of the relaxation term. In the relaxation zone the coordinate normal to the boundary is n.

Referring now to FIG. 1, the combination of the TCS and FRS automated methods of the present embodiment for correcting the baroclinic normal velocity on an inner domain, method 150, can include, but is not limited to including, the steps of bilinearly interpolating 151 transport values of an outer domain to an inner grid of an inner domain at points along lateral boundaries of the inner domain, the outer domain encompassing the inner domain, interpolating 153 sea surface height η from an outer grid of the outer domain to the inner grid, correcting 155 the interpolated transport values by setting an average of the interpolated transport values to zero for every time interval between each boundary value of the outer domain, setting 157 a relaxation zone adjacent to the lateral boundaries, the relaxation zone having a predetermined width and an absorption coefficient of a predetermined value at the outer edge of the relaxation zone, the relaxation zone enabling outwardly directed fluxes to exit smoothly and without reflection and without generation of artificial perimeter currents, and the relaxation zone enabling fluxes from the outer domain to enter and affect a solution in the inner domain without creating a discontinuity and without being excessively damped, and computing 159 the corrected baroclinic normal velocity based on the corrected interpolated transport values, the interpolated sea surface height, and the relaxation zone.

Figure 2:
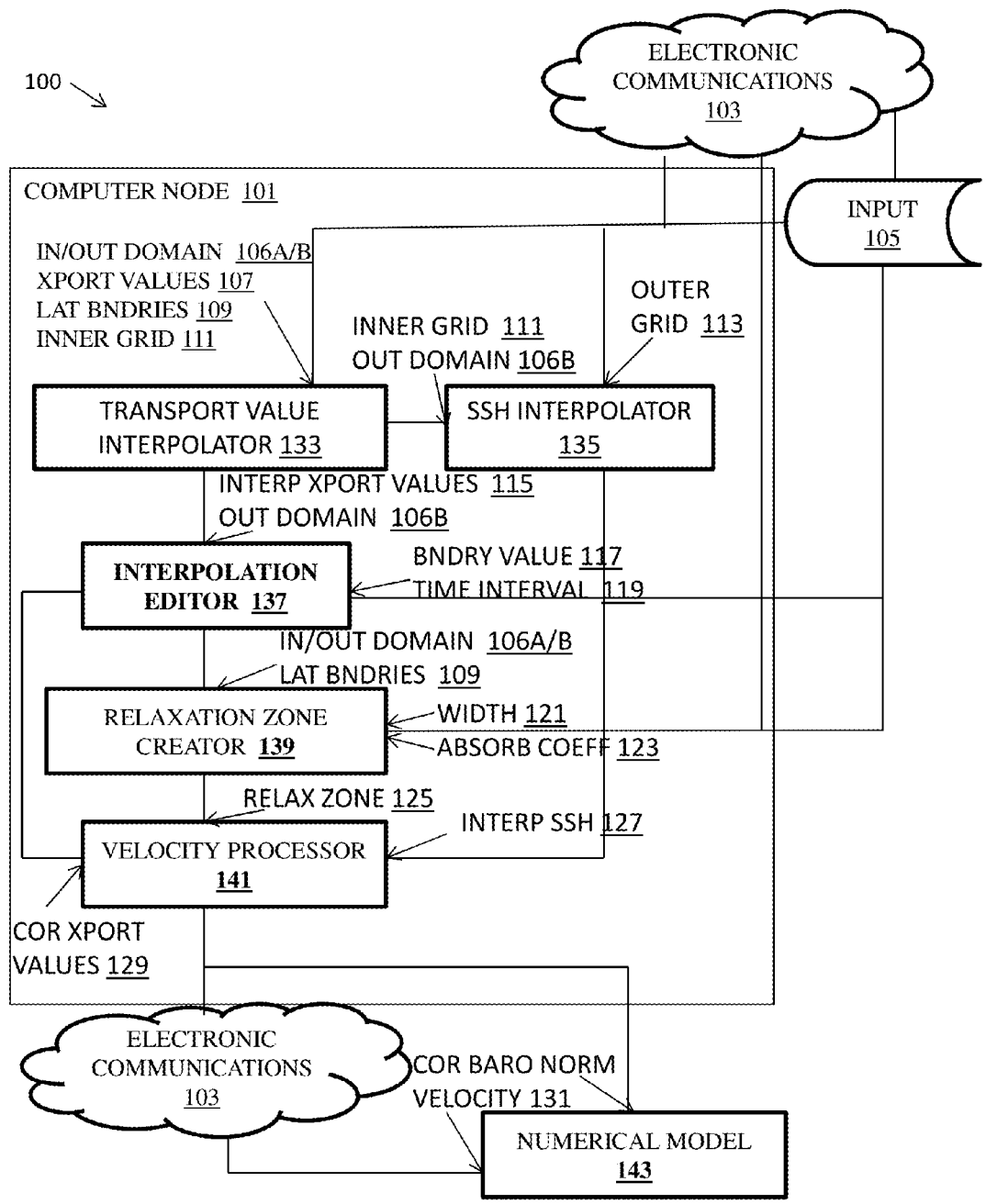
FIG. 2 is a schematic block diagram of the system of the present embodiment.
Figure 4:
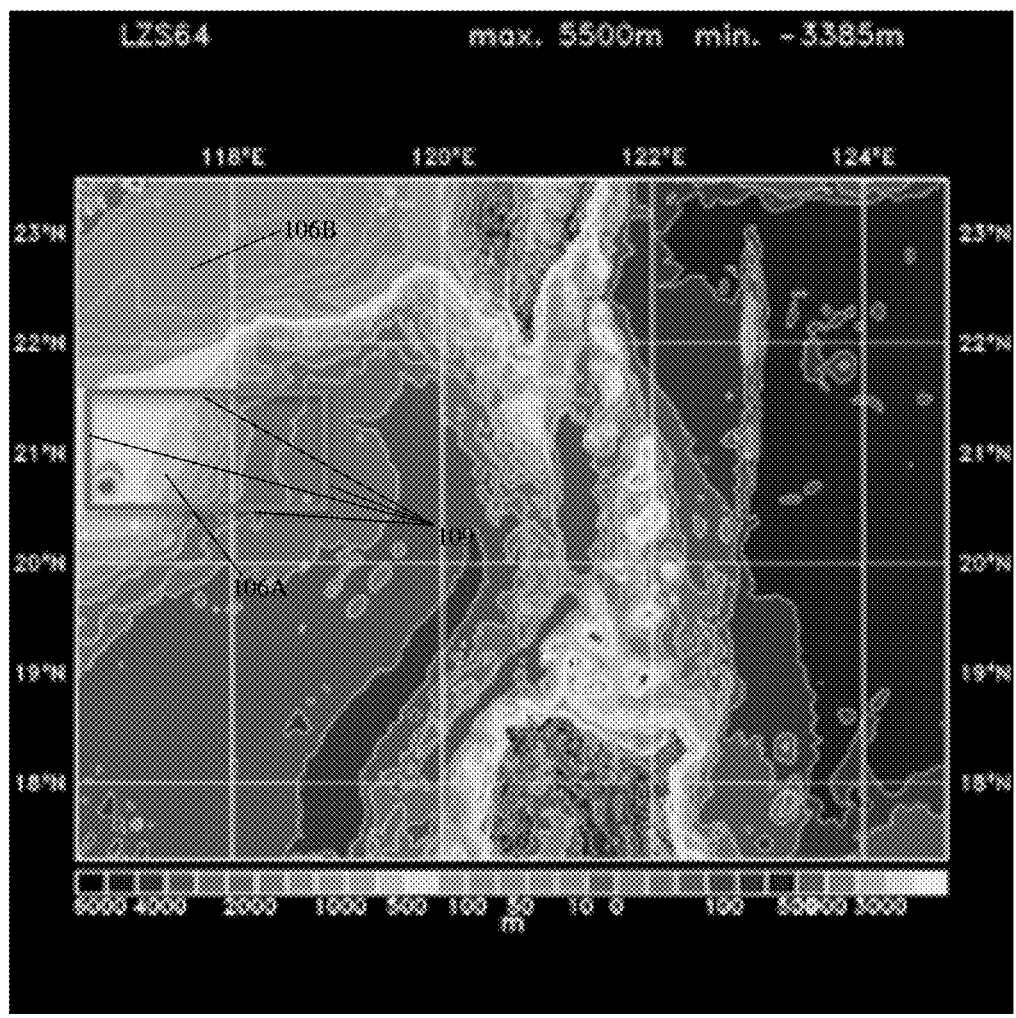
FIG. 4 is a screen shot of the Luzon Straits 1/64 degree (LZS64) RELO NCOM domain with the Dongsha Plateau 1/200 degree (DSP200) MIT domain shown by the blue rectangle (Dongsha Island is the red dot in the southwestern corner of the DSP200 domain)

Referring now to FIGS. 2 and 4, system 100 for correcting the baroclinic normal velocity on an inner domain, can include, but is not limited to including, transport value interpolator 133 bilinearly interpolating transport values 107 of an outer domain 106B (FIG. 4) to an inner grid 111 of an inner domain 106A at points along lateral boundaries 109 (FIG. 4) of inner domain 106A (FIG. 4), outer domain 106B (FIG. 4) encompassing inner domain 106A (FIG. 4). Inner domain 106A, outer domain 106B, transport values 107, lateral boundaries 109, and inner grid 111 can be received, for example, but not limited to, from electronic communications 103 or input 105. System 100 can also include sea surface height interpolator 135 interpolating sea surface height η 127 from outer grid 113 of outer domain 106B to inner grid 111, and interpolation editor 137 correcting interpolated transport values 115 by setting an average of interpolated transport values 115 to zero for every time interval 119 between each boundary value 117 of outer domain 106B. System 100 can also include relaxation zone creator 139 setting relaxation zone 125 adjacent to lateral boundaries 109, relaxation zone 125 having predetermined width 121 and absorption coefficient 123 of a predetermined value at the outer edge of relaxation zone 125, relaxation zone 125 enabling outwardly directed fluxes to exit smoothly and without reflection and without generation of artificial perimeter currents, and relaxation zone 125 enabling fluxes from outer domain 106B to enter and affect a solution in inner domain 106A without creating a discontinuity and without being excessively damped, and velocity processor 141 computing corrected baroclinic normal velocity 131 based on corrected interpolated transport values 129, interpolated sea surface height 127, and relaxation zone 125. System 100 can execute in, for example, but not limited to, computer node 101, or in multiple computers, or computers with multiple processors. System 100 can provide corrected barometric normal velocity 131 to, for example, but not limited to, numerical model 143 through, for example, but not limited to, electronic communications 103.

Figure 3:
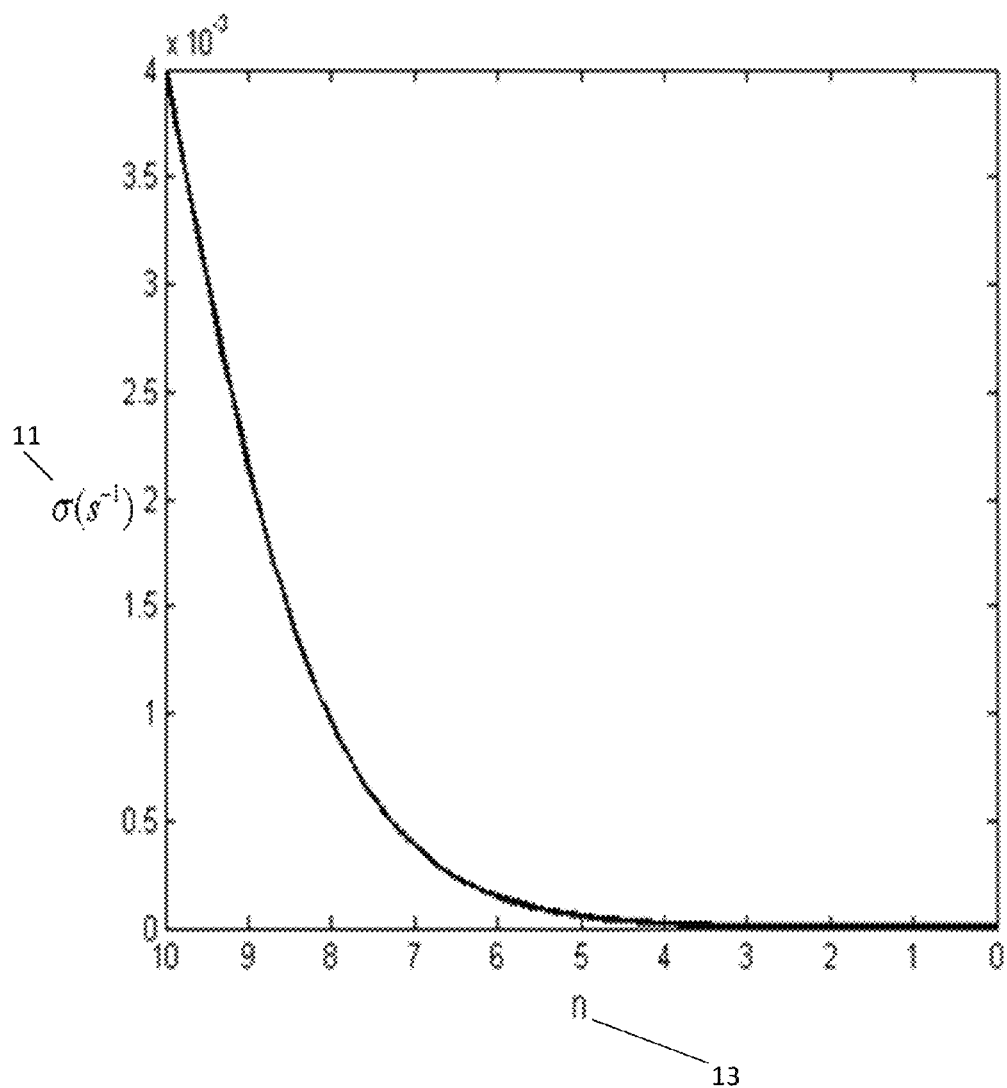
FIG. 3 is a graphical representation of the relaxation zone.

Referring now primarily to FIG. 3, relaxation zone 125 (FIG. 2) at the western boundary is shown. Graphed is the value of σ(n) 11 where n is the coordinate normal to the boundary and width of the relaxation zone (δ=NΔn, N=10) grid points). Similar relaxation zones exist inside each lateral boundary 109 (FIG. 4) between inner domain 106A (FIG. 4) and outer domain 106B (FIG. 4). Width 121 (FIG. 2) of relaxation zone 125 (FIG. 2) is δ=NΔn with n 13 being 0 at the interior edge of relaxation zone 125 (FIG. 2). Note that σ 11 can also be a function of the tangential coordinate in relaxation zone 125 (FIG. 2). However, variation of σ 11 tangentially may not be necessary when values of outer domain 106B (FIG. 2) are well defined, as in the case of the present embodiment in which a nested model solution is used rather than climatology. A characteristic length scale for the damping of features, i.e. width 121 (FIG. 2) of relaxation zone 125 (FIG. 2), in terms of a barotropic gravity wave speed and the damping coefficient has previously been defined as $$\delta = \frac{\sqrt{gh}}{\sigma} \quad (6)$$

Equation (6) can be generalized to $$\delta = \frac{u_n}{\sigma} \quad (7)$$

where $u_n$ is the nominal normal velocity of the dominant baroclinic feature moving through relaxation zone 125 (FIG. 2). If $l_n$ is the nominal length scale of the features to be modified in relaxation zone 125 (FIG. 2), then width 121 (FIG. 2) of relaxation zone 125 (FIG. 2) should be approximately δ=NΔn>$l_n$ where N is order 10. Absorption coefficient 123 (FIG. 2) can scale like $$\sigma \approx \frac{u_n}{N\Delta n} \quad (8)$$

Relaxation zone 125 (FIG. 2) can be more effective if σ varies spatially across relaxation zone 125 (FIG. 2). σ can take one of several geometric forms, including a polynomial form $$\sigma(n) = \sigma_m \left(\frac{n}{\delta}\right)^\alpha \quad (9)$$

where α>0 and $\sigma_m$ is the value at the outer edge of relaxation zone 125 (FIG. 2). When α=2 this reduces to a previously known quadratic form which can be used interchangeably with a hyperbolic tangent form, $$\sigma(n) = \sigma_m \tanh\left(\frac{n}{\delta}\right), . \quad (10)$$

In the present embodiment, relaxation zone 125 (FIG. 2) is ten grid points wide. In the present embodiment, the optimal value of $\sigma_m$ is 0.004. The spatial variation of σ is given by equation (10). There is a relaxation zone adjacent to each of the four boundaries 109 (FIG. 4).

Referring now to FIG. 4, the nested configuration of the present embodiment can include inner domain 106A using, for example, but not limited to, the MIT model in a 2° E×1° N domain centered at (21N, 117.75E) with 1/200° (approximately 500 m) horizontal resolution referred to herein as the DSP200 (Dongsha Plateau 1/200°) domain. This is nested inside outer domain 106B using, for example, but not limited to, a 8° E×6° N RELO NCOM domain at 1/64° (approximately 2 km) horizontal resolution referred to herein as the LZS64 (Luzon Straits 1/64°) domain. The LZS64 domain obtains its initial conditions and boundary conditions from archived data. The data can be archived during forecasts by numerical model 143 (FIG. 2) such as, for example, 59° E×45° N regional NCOM domain at 1/16° (approximately 6 to 9.5 km) resolution referred to herein as the EAS16NFS (East Asian Seas 1/16° Nowcast/Forecast System). The EAS16NFS is part of the 1/8° (nominally 14 km resolution) Global NCOM Nowcast/Forecast system.

TABLE 1

Model Parameters

| | Latitude (x) | Longitude (y) | Z |
| --- | --- | --- | --- |
| Nominal grid spacing | 1/200° (500 m) | 1/200° (500 m) | .75-270 m |
| Number of grid points | 348 | 200 | 35 |
| Viscosity (m²s⁻¹) | 0.24 | 0.24 | 7.0 × 10⁻⁴ |
| Temperature diffusivity (m²s⁻¹) | 3.4 | 3.4 | 1.0 × 10⁻⁴ |
| Salinity diffusivity (m²s⁻¹) | 3.4 × 10⁻² | 3.4 × 10⁻² | 1.0 × 10⁻⁶ |
| Time step (s) | 5 | | |

The MITgcm nonhydrostatic ocean model is an open source application available at http://mitgcm.org/. It is a finite volume model with orthogonal curvilinear coordinates in the horizontal and variable cell thickness in the vertical. Several options are available for advection and diffusion calculations. In nonhydrostatic mode a three dimensional equation must be solved for the pressure. This is done using a preconditioned conjugate gradient solver. The model can include a complete treatment of the Coriolis force and a partial cell treatment of topography. The model can use a flexible domain decomposition method for efficient parallel processing. The model parameters for the present embodiment can be, for example, but not limited to, those listed in Table 1.

In the present embodiment, the global NCOM nowcast/forecast system is forced with for example, but not limited to, the Navy Operational Global Atmospheric Prediction System (NOGAPS) and with a regional forecast system, the Coupled Ocean Atmosphere Prediction System (COAMPS). Equilibrium tides are obtained from the OSU global tidal database. Ten constituents are included: K1, O1, P1, Q1, M2, S2, N2, K2, MF, and MM. This includes both height and velocity values of the tides. The bathymetry used for the system is the 2 minute NRL Digital Bathymetric DataBase (NRL DBDB2, http://www7320.nrlssc.navy.mil/DBDB2_WWW/), a global 2-min ocean bathymetry data base which is based on the NAVO global 5-min DBDBV bathymetry and is enhanced with other higher resolution bathymetries and coastlines. The model also assimilates satellite altimeter data and Multi-Channel Sea Surface Temperature (MCSST) from satellite-derived AVHRR to further improve accuracy. Submesoscale, nonhydrostatic hindcasts were conducted in the DSP200 domain for 30 days starting on Apr. 1, 2005 at 0000Z. The hindcasts were initialized using archived data from LZS64 and the boundary conditions were also from LZS64 data archived at one hour intervals. The initial data included baroclinic tides, long wavelength internal waves and fronts that develop into NLIWs in the nonhydrostatic domain.

Coupling domains using a Flather boundary condition on the barotropic flow and no explicit conservation scheme for the baroclinic flow field can conserve mass sufficiently for most cases but also can produce trends in temperature. The change in spatial mean sea surface height in the inner domain, $\overline{\eta_t^D}$, which results from the transport based on equation (1) is $$\overline{\eta_t^D} = \xi_{t_1} \quad (11)$$

The values of $\overline{\eta_t^D}$ can be unrealistically large and can indicate erroneously large changes in volume when there is non-conservative transport.

Figure 5:
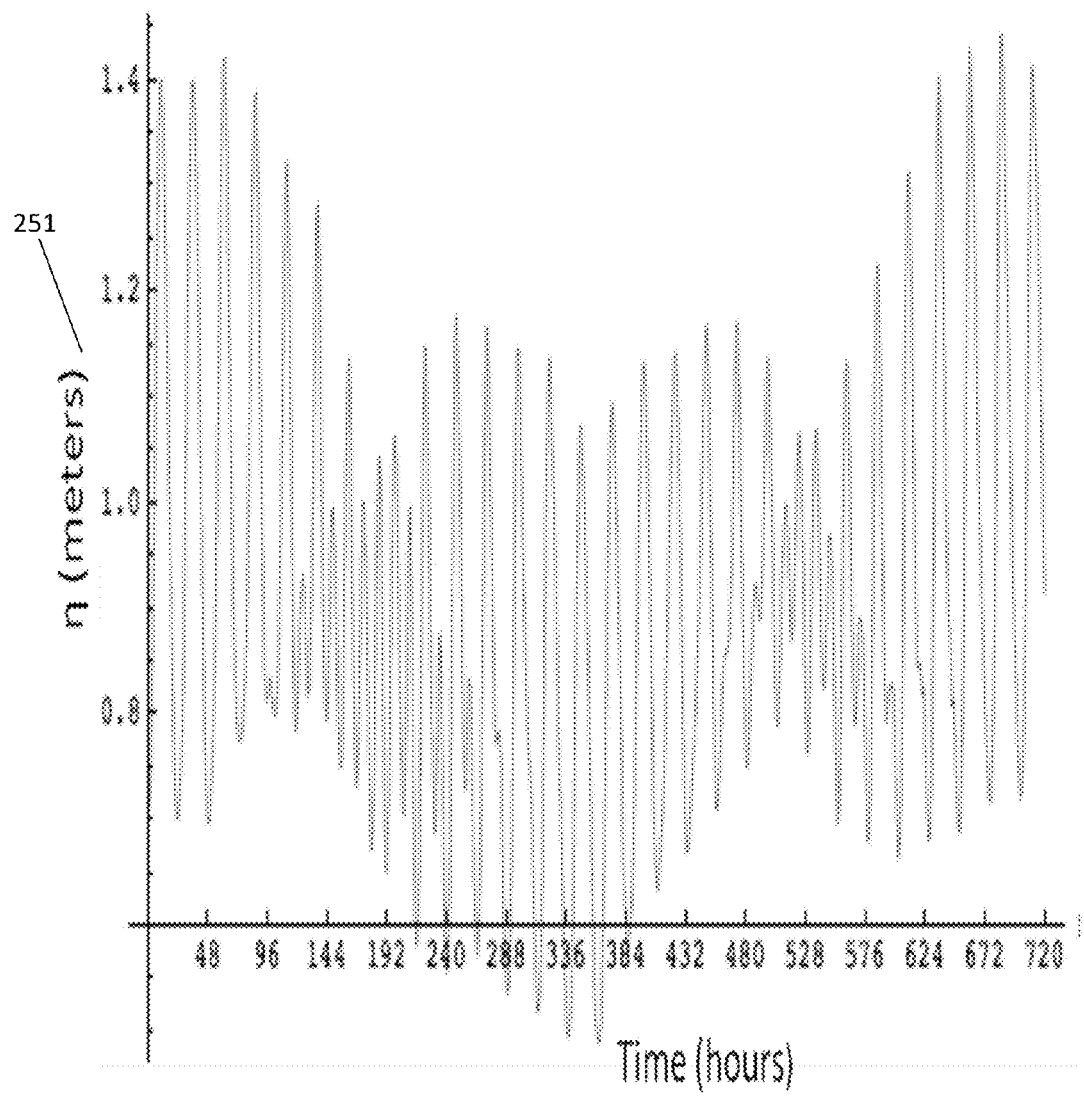
FIG. 5 is a graphical representation of the average sea surface height after application of the TCS of the present embodiment.

Referring now to FIG. 5, average sea surface height 251, $\overline{\eta}$, is shown after application of the Transport Correction Scheme (TCS). The smaller range of $\overline{\eta}$ 251 indicates improved volume conservation. The tidal signal, which is a strong component of the forcing in this area, is now clearly visible. TCS was applied to the normal velocities interpolated from outer domain 106B (FIG. 2) at lateral boundaries 109 (FIG. 2) of inner domain 106A (FIG. 2). The resulting $\int_\tau \overline{\eta_t^D} dt$ is shown graphically. Large oscillations or large trends in $\overline{\eta_t^D}$ can be viewed as an indicator of the error in the volume transport which resulted from the interpolation of variables from outer domain 106B (FIG. 2) onto inner grid 111 (FIG. 2). As $\overline{\eta_t^D}$ becomes smaller it exhibits more realistic values and temporal variability such as the tidal variations shown in FIG. 5. Without the TCS the values of $\overline{\eta_t^D}$ were −30 m to 20 m. With the TCS $\overline{\eta_t^D}$ is 0.6 to 1.4 m. Point measurements of $\eta$ in the northern South China Sea yield values of 0.3 m to 0.7 m and tidal models give 0.6 m-1.0 m. The TCS can also reduce erroneous trends in thermocline displacement and volume averaged temperature in the model results.

Figures 6A, 6B:
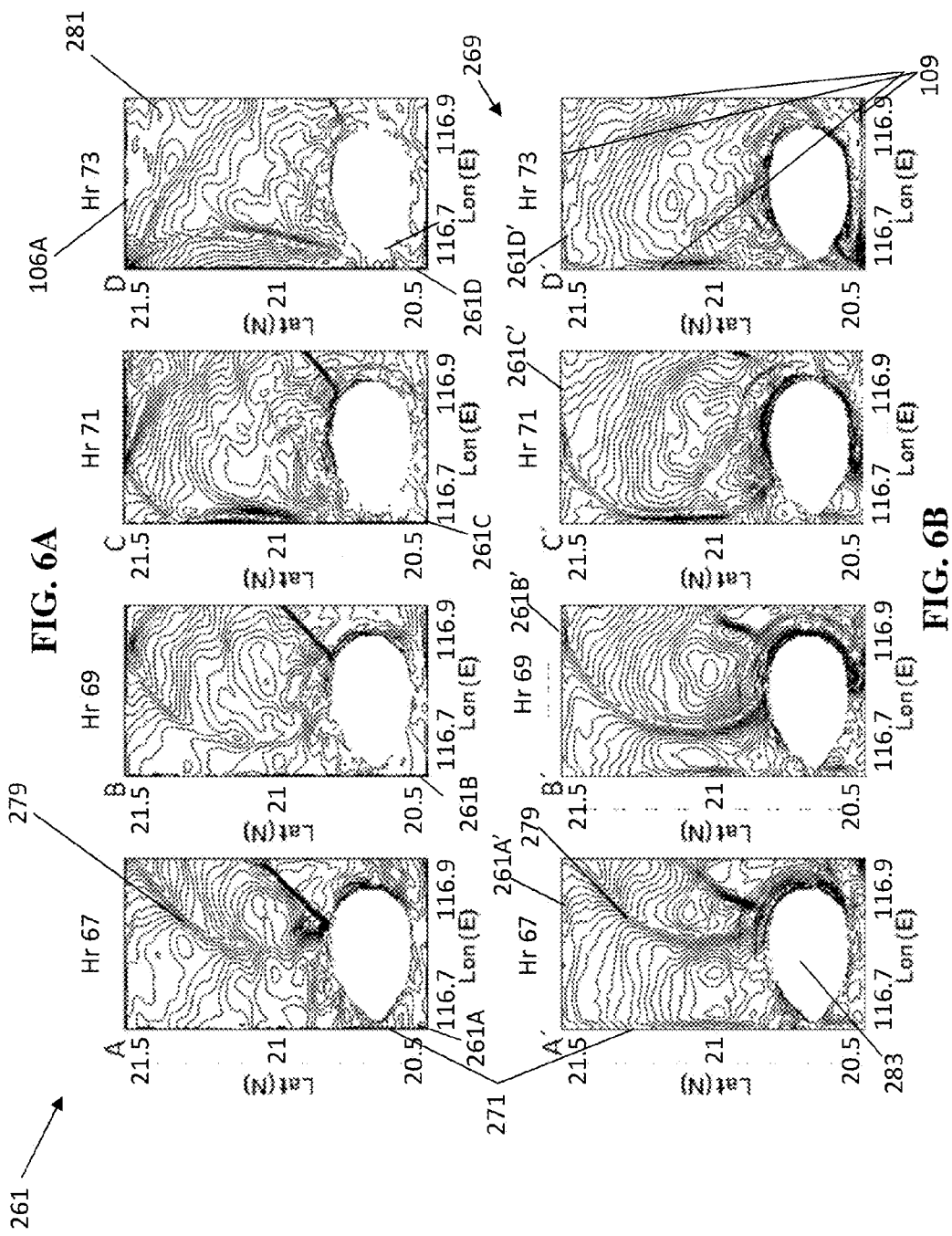
FIG. 6A is a set of graphical representations of temperature at 150 m for a first experiment with no FRS.
FIG. 6B is a set of graphical representations of temperature at 150 m for a second experiment, which is the same experiment except with the FRS.

Referring now primarily to FIGS. 6A and 6B, shown are first experiments 261 without the FRS and second experiments 269 with the FRS. Ideally the open boundaries of a nested model should be transparent to both incoming and outgoing flows. However, some submesoscale features, e.g. eddies and NLIWs are sometimes reflected at the open boundaries where they should propagate out of inner domain 106A (FIG. 4) as shown in top row first experiment 261 without the FRS. This is due to the mismatch of properties, such as propagation speed and amplitude, between the representations of features in inner domain 106A (FIG. 4) and outer domain 106B (FIG. 4). The increased resolution in inner domain 106A (FIG. 4) allows features to develop with smaller scales, larger amplitudes and different phase speeds than the representation in outer domain 106B (FIG. 4) of the same features. Also, features can develop that are not resolved in outer domain 106B (FIG. 4). This can be due to improved dynamical resolution and lower numerical viscosity. Furthermore, the nonhydrostatic physics can include a more complete representation of the vertical momentum resulting in more robust vertical motion in inner domain 106A (FIG. 4) and additional features.

Figure 7:
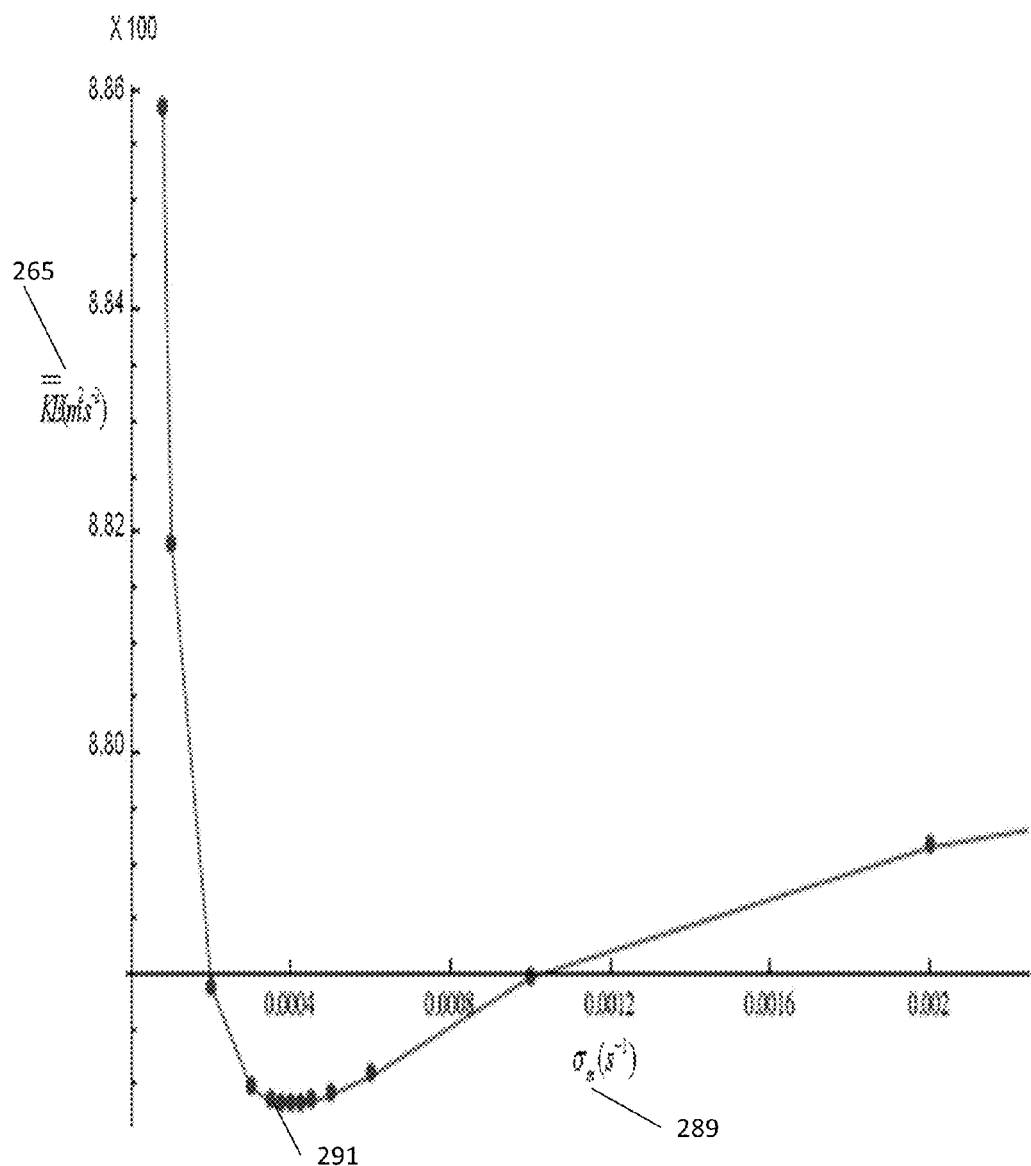
FIG. 7 is a graphical representation of the average horizontal kinetic energy ($\overline{KE}$) as a function of the maximum absorption parameter ($\sigma_m$)

Referring now to FIG. 7, in addition to reflections, mismatches between the inner domain and outer domain solutions can cause the formation of currents flowing along the perimeter of the inner domain. Because the reflections can be more abundant and more disruptive, and because eliminating the reflections can also eliminate perimeter currents, in the present embodiment, there is a focus on eliminating reflections from the boundaries. FRS can be used to reduce or eliminate mismatches. FRS matches the outer domain solution and the inner domain solution in relaxation zone 125 (FIG. 2) adjacent to the interface between inner domains 106A (FIG. 4) and outer domain 106B (FIG. 4). Experiments designed to determine the optimal FRS were compared graphically and using the total kinetic energy averaged over the inner domain for the entire experiment, $$\overline{KE} = \frac{1}{T}\int \frac{1}{V}\int \int \int_V (u^2 + v^2 + w^2) dV dt \qquad (12)$$

as a quantitative metric. $\overline{KE}$ 265 is chosen as a metric because waves artificially reflected from the boundaries will increase the $\overline{KE}$ 265 in inner domain 106A (FIG. 4).

Referring again to FIGS. 6A and 6B, the reflection of NLIWs at lateral boundaries 109 (FIG. 4) of inner domain 106A can be seen most clearly at western boundary 271. The hydrostatic representation NLIWs generally enter inner domain 106A (FIG. 4) through eastern boundary 281. They are transformed by the nonhydrostatic physics and improved resolution in inner domain 106A (FIG. 4) and by interactions with the topography. More NLIWs are locally generated and these interact with the remotely generated NLIWs as they propagate across inner domain 106A (FIG. 4) in a mainly westerly direction. Thus, the mismatches between the low resolution, hydrostatic solution of outer domain 106B (FIG. 4) and the high resolution, nonhydrostatic solution in inner domain 106A (FIG. 4) are particularly large at western boundary 271. As the waves attempt to exit inner domain 106A (FIG. 4), this mismatch of solutions creates reflections which can be seen in animations of the inner domain solutions of first experiments 269 without the FRS.

Referring again to FIGS. 6A and 6B, one of the reflection events is shown using the temperature field at 150 m on western side 271. At hour 67 (ref. num 267) NLIW front 279 is clearly seen in first experiment 261 without the FRS and second experiment 269 with the FRS. In first experiment 261, NLIW front 279 approaches western boundary 279 and is reflected (ref. nums. 261A-D). NLIW front 279 is most obvious north of Dongsha Island 283. At hour 69 (ref. nums. 261B and 261W) NLIW front 279 is approaching western boundary 271. At hour 71 (ref. num. 261C) NLIW front 279 begins to intersect western boundary 271 and at hour 73 (ref. num. 261D) NLIW front 279 can be seen reflecting from western boundary 271 and propagating back into inner domain 106A. NLIW wave 279 then travels back into the central region of inner domain 106A and significantly impacts the solution.

Referring still further to FIGS. 6A and 6B, with respect to second experiment 269, no part of NLIW front 279 is reflected from western boundary 279. At hour 69 (ref. num. 261W), NLIW wave 279, approaches western boundary 279. At hour 71 (ref. num. 261C') NLIW wave 279 starts to intersect western boundary 279. No reflected front is visible at hour 73 (ref. num. 261D'). The solutions in second experiment 269 and first experiment 261 are not identical. This is expected since there is less reflected energy in second experiment 269 than in first experiment 261. Also, since the energy levels can be different, the details of the solution in inner domain 106 may not be the same and the propagation speeds of NLIW waves 279 and Submesoscale Features (SMFs) can also be different.

In addition to the qualitative visual assessment of the FRS shown in FIG. 6B, the magnitude of $\overline{KE}$ 265 can be used as a quantitative measure. If NLIW waves 279 (FIG. 6A) and SMFs are artificially reflected at the open boundaries, then the magnitude of $\overline{KE}$ 265 should be larger in inner domain 1006 (FIG. 6A). Values of $\overline{KE}$ 265 are listed in Table 2, where the largest $\overline{KE}$ was found in first experiment 261. Spurious reflections at the boundaries can be expected to lead to higher energy levels.

TABLE 2

Average Kinetic Energy in Inner Domain as a function of maximum relaxation coefficient and relaxation profile.

| Relaxation profile | Maximum relaxation coefficient, $\sigma_m \times 10^2$ | $\overline{KE}$ (×100) |
|---|---|---|
| No Relaxation region | N/A | 9.32 |
| Quadratic | 4 | 8.89 |
| Hyperbolic Tangent | 4 | 8.80 |
| Hyperbolic Tangent | 2 | 8.79 |
| Hyperbolic Tangent | 1 | 8.78 |
| Hyperbolic Tangent | 0.4 | 8.77 |
| Hyperbolic Tangent | 0.2 | 8.78 |
| Hyperbolic Tangent | 0.1 | 8.82 |
| Hyperbolic Tangent | 0.02 | 8.93 |

Experiments to minimize $\overline{KE}$ using the quadratic and hyperbolic tangent profiles, (9) and (10) and for several values of the maximum relaxation coefficient, $\sigma_m$ have been conducted. The results are shown in Table 2 and FIG. 7. From Table 2 it can be seen that in FRS experiments 269 (FIG. 6B), the $\overline{KE}$ was lower than in first experiment 261 (FIG. 6A). In the present embodiment, FRS experiments 269 (FIG. 6B) include a small but finite $\sigma_m$ 289 (FIG. 7) and a hyperbolic tangent profile. There is a $\sigma_m$ 289 (FIG. 7) which can yield a minimum $\overline{KE}$ 291. At one extreme $\sigma_m$ 289 cannot become arbitrarily small since as $\sigma_m$ 289 approaches zero the case with no FRS is recovered, see equation (10). As $\sigma_m$ 289 becomes larger the spatial variation of the amplitude of the damped wave in the relaxation zone becomes too large to resolve with a given Δn. The spatial variation of σ also matters. If σ changes too slowly across the relaxation zone the wave will not be completely damped before it passes through the relaxation zone and will be reflected off the outer domain edge of the relaxation zone. If σ changes too quickly the wave will be reflected near the inner domain edge of the relaxation zone. This is equivalent to moving the boundary close to the inner edge of the relaxation zone. In the present embodiment, there is a small correction which changes gradually at the interior edge of the relaxation zone and more rapidly as the outer domain is approached.

Figure 8:
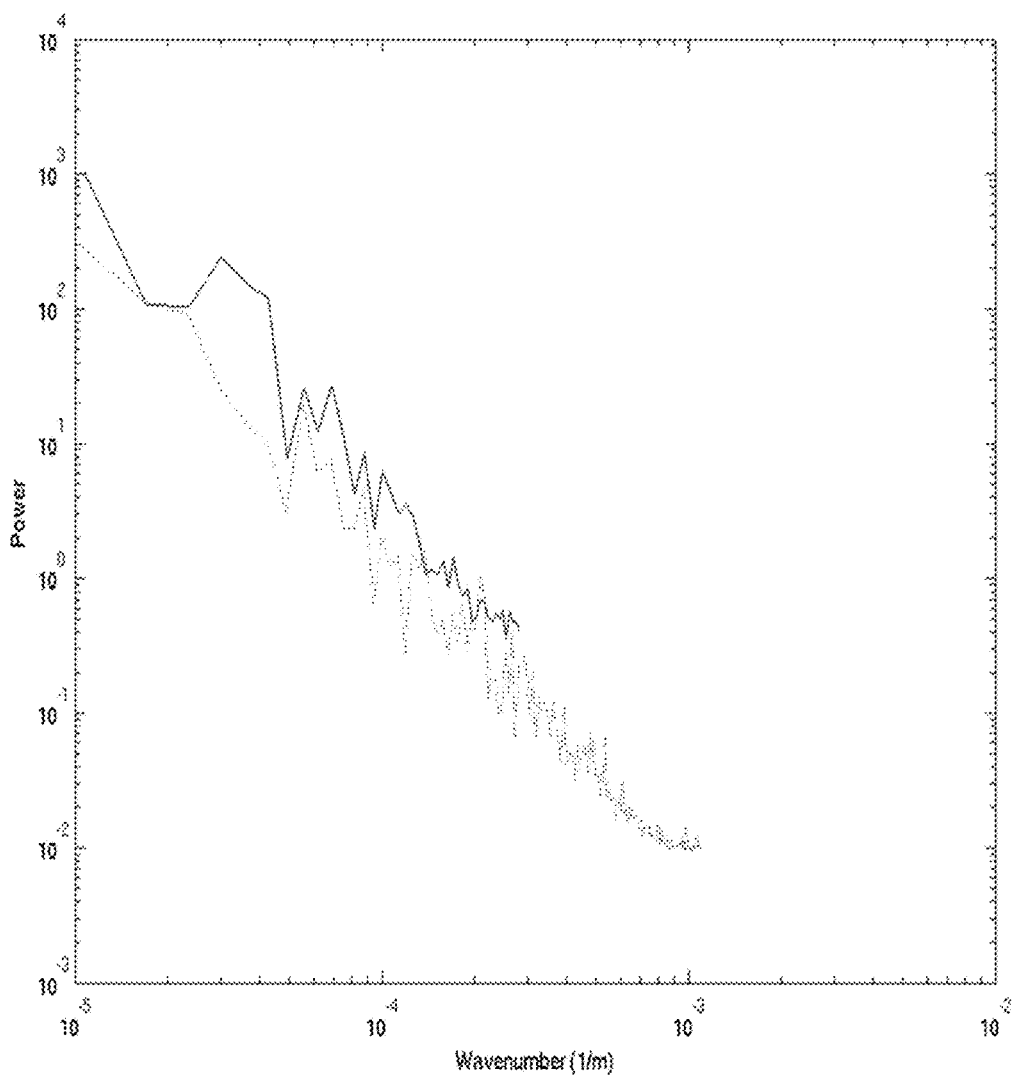
FIG. 8 is a graphical representation of the temperature spectra from the inner domain solution (dotted line) and the outer domain solution (solid line) cropped to the inner domain; spectra are calculated along longitudes then averaged across latitudes.

Referring now to FIG. 8, to quantify the review, wavenumber temperature spectra for the outer domain solution cropped to the inner domain area can be compared to that for the inner domain solution. A spectrum can be calculated along each longitudinal grid line, using grid lines starting 10 grid points into inner domain 106A (FIG. 4) from the southern boundary and ending 10 grid points into inner domain 106A (FIG. 4) from the northern boundary, and averaging the spectra over all lines. The resulting spectra are very similar up to the wavenumber cutoff for the outer domain. The spectra from the inner domain continue to higher wavenumbers. This demonstrates that the low wavenumber energy has been passed from the outer domain solution to the inner domain solution with no appreciable alteration. In the present embodiment, nested domains are required to achieve the resolution needed to model submesoscale dynamics as part of a global system. For example, the submesoscale domain can be nested in a mesoscale domain, which can be nested in a regional domain, which can be nested inside a global domain. Through the combination of real-time forecast systems and off-line hindcast systems, a global to submesoscale modeling system can be accomplished.

Embodiments of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. In an exemplary embodiment, the software for the system is written in Fortran and C. The system can operate on a computer having a variable number of CPUs. Other alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, on multiple CPUs in parallel, or can be accomplished on different computers. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again primarily to FIG. 1, method 150 can be, in whole or in part, implemented electronically. Signals representing actions taken by elements of system 100 (FIG. 2) and other disclosed embodiments can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. An automated method for correcting the baroclinic normal velocity on an inner domain comprising the steps of:
   obtaining transport values that are archived by a numerical model during a plurality of forecasts, wherein the numerical model includes an inner grid of the inner domain and an outer grid of an outer domain for representing a plurality of features;
   bilinearly interpolating the transport values of the outer domain to the inner grid of the inner domain at points along lateral boundaries of the inner domain, the outer domain encompassing the inner domain;
   interpolating sea surface height $\eta$ from the outer grid of the outer domain to the inner grid;
   correcting the interpolated transport values by setting an average of the interpolated transport values to zero for every time interval between each boundary value of the outer domain;
   determining a total kinetic energy averaged over the inner domain for each of a plurality of coefficient values;
   selecting an absorption coefficient from the plurality of coefficient values based on the total kinetic energy, wherein the absorption coefficient is a hyperbolic tangent profile that varies spatially across a relaxation zone;
   setting the relaxation zone adjacent to the lateral boundaries, the relaxation zone having a predetermined width and the absorption coefficient of a predetermined value at an outer edge of the relaxation zone, the relaxation zone enabling outwardly directed fluxes to exit smoothly and without reflection and without generation of artificial perimeter currents, and the relaxation zone enabling fluxes from the outer domain to enter and affect a solution in the inner domain without creating a discontinuity and without being excessively damped;
   computing the corrected baroclinic normal velocity based on the corrected interpolated transport values, the interpolated sea surface height, and the relaxation zone; and
   representing a feature of the plurality of features in the numerical model based on the corrected baroclinic normal velocity, wherein the feature is represented in a smaller scale of the inner domain that is not resolved in the outer domain.

2. The method as in claim 1 further comprising the step of:
   receiving the inner domain, the outer domain, the transport values, the lateral boundaries, and the inner grid from an electronic communications network.

3. The method as in claim 1 further comprising the step of:
   receiving the inner domain, the outer domain, the transport values, the lateral boundaries, and the inner grid from electronic input.

4. A system for correcting the baroclinic normal velocity on an inner domain comprises:
   a transport value interpolator:
      obtaining transport values that are archived by a numerical model during a plurality of forecasts, wherein the numerical model includes an inner grid of the inner domain and an outer grid of an outer domain for representing a plurality of features; and
      bilinearly interpolating transport values of the outer domain to the inner grid of the inner domain at points along lateral boundaries of the inner domain, the outer domain encompassing the inner domain;
   a sea surface height interpolator interpolating sea surface height $\eta$ from the outer grid of the outer domain to the inner grid;

an interpolation editor correcting the bilinearly interpolated transport values by setting an average of the bilinearly interpolated transport values to zero for each time interval between each boundary value of the outer domain;

a relaxation zone creator:
   determining a total kinetic energy averaged over the inner domain for each of a plurality of coefficient values;
   selecting an absorption coefficient from the plurality of coefficient values based on the total kinetic energy, wherein the absorption coefficient is a hyperbolic tangent profile that varies spatially across a relaxation zone; and
   setting the relaxation zone adjacent to the lateral boundaries, the relaxation zone having a predetermined width and the absorption coefficient of a predetermined value at an outer edge of the relaxation zone, the relaxation zone enabling outwardly directed fluxes to exit smoothly and without reflection and without generation of artificial perimeter currents, and the relaxation zone enabling fluxes from the outer domain to enter and affect a solution in the inner domain without creating a discontinuity and without being excessively damped; and a velocity processor:
   computing a corrected baroclinic normal velocity based on corrected interpolated transport values, interpolated sea surface height, and the relaxation zone; and
   representing a feature of the plurality of features in the numerical model based on the corrected baroclinic normal velocity, wherein the feature is represented in a smaller scale of the inner domain that is not resolved in the outer domain.

5. The system as in claim 4 wherein the transport value interpolator receives the inner domain, the outer domain, the transport values, the lateral boundaries, and the inner grid from an electronic communications network.

6. The system as in claim 4 wherein the transport value interpolator receives the inner domain, the outer domain, the transport values, the lateral boundaries, and the inner grid from electronic input.

7. A computer processor executing instructions from a computer program for correcting the baroclinic normal velocity on an inner domain, the computer program stored on a non-transitory computer readable medium, the instructions comprising the steps of:
   obtaining transport values that are archived by a numerical model during a plurality of forecasts, wherein the numerical model includes an inner grid of the inner domain and an outer grid of an outer domain for representing a plurality of features;
   bilinearly interpolating transport values of the outer domain to the inner grid of the inner domain at points along lateral boundaries of the inner domain, the outer domain encompassing the inner domain;
   interpolating sea surface height $\eta$ from the outer grid of the outer domain to the inner grid;
   correcting the interpolated transport values by setting an average of the interpolated transport values to zero for every time interval between each boundary value of the outer domain;
   determining a total kinetic energy averaged over the inner domain for each of a plurality of coefficient values;
   selecting an absorption coefficient from the plurality of coefficient values based on the total kinetic energy, wherein the absorption coefficient is a hyperbolic tangent profile that varies spatially across a relaxation zone;
   setting the relaxation zone adjacent to the lateral boundaries, the relaxation zone having a predetermined width and the absorption coefficient of a predetermined value at an outer edge of the relaxation zone, the relaxation zone enabling outwardly directed fluxes to exit smoothly and without reflection and without generation of artificial perimeter currents, and the relaxation zone enabling fluxes from the outer domain to enter and affect a solution in the inner domain without creating a discontinuity and without being excessively damped;
   computing the corrected baroclinic normal velocity based on the corrected interpolated transport values, the interpolated sea surface height, and the relaxation zone; and
   representing a feature of the plurality of features in the numerical model based on the corrected baroclinic normal velocity, wherein the feature is represented in a smaller scale of the inner domain that is not resolved in the outer domain.

8. The computer processor as in claim 7 further comprising instructions executing the step of:
   receiving the inner domain, the outer domain, the transport values, the lateral boundaries, and the inner grid from an electronic communications network.

9. The computer processor as in claim 7 further comprising instructions executing the step of:
   receiving the inner domain, the outer domain, the transport values, the lateral boundaries, and the inner grid from electronic input.

* * * * *